US010762724B2

(12) United States Patent
Ienaga et al.

(10) Patent No.: US 10,762,724 B2
(45) Date of Patent: Sep. 1, 2020

(54) VEHICLE CONTROL DEVICE, SERVER, VEHICLE MOTOR CONTROL SYSTEM, AND VEHICLE MOTOR CONTROL METHOD

(71) Applicant: SUBARU CORPORATION, Tokyo (JP)

(72) Inventors: Hiroshi Ienaga, Tokyo (JP); Shinichi Sakaguchi, Tokyo (JP); Takahiro Kobayashi, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 318 days.

(21) Appl. No.: 15/869,935

(22) Filed: Jan. 12, 2018

(65) Prior Publication Data

US 2018/0276906 A1 Sep. 27, 2018

(30) Foreign Application Priority Data

Mar. 24, 2017 (JP) ................................. 2017-059058

(51) Int. Cl.
*G07C 5/00* (2006.01)
*B60W 30/188* (2012.01)
*B60W 10/08* (2006.01)
*B60L 15/20* (2006.01)
(Continued)

(52) U.S. Cl.
CPC .............. *G07C 5/008* (2013.01); *B60L 15/20* (2013.01); *B60W 10/08* (2013.01);
(Continued)

(58) Field of Classification Search
CPC ....... G07C 5/008; G07C 5/0808; B60L 15/20; B60W 10/08; B60W 30/188;
(Continued)

(56) References Cited

U.S. PATENT DOCUMENTS

2006/0161641 A1* 7/2006 Haegebarth et al. ..... G08G 1/20
701/117
2009/0091439 A1* 4/2009 Sekiyama et al. ...... G08G 1/127
340/459
(Continued)

FOREIGN PATENT DOCUMENTS

JP 2000-092613 A1 3/2000
JP 2008-285075 A 11/2008
(Continued)

OTHER PUBLICATIONS

Japanese Office Action, dated Aug. 14, 2018, in Japanese Application No. 2017-059058 and English Translation thereof.
(Continued)

*Primary Examiner* — Dale W Hilgendorf
(74) *Attorney, Agent, or Firm* — McGinn I.P. Law Group, PLLC.

(57) ABSTRACT

A vehicle control device includes: a motor information acquisition unit, a transmitting unit, a receiving unit and a motor controller. The motor information acquisition unit is configured to acquire motor information about a motor for driving a vehicle with the motor being in a predetermined state. The transmitting unit is configured to transmit the acquired motor information to an external server. The receiving unit is configured to receive an adaptive value of a motor control parameter. The adaptive value is adapted by the server on a basis of the motor information. The motor controller is configured to control the motor on a basis of the received adaptive value.

16 Claims, 5 Drawing Sheets

(51) Int. Cl.
   *B60W 50/00*   (2006.01)
   *G07C 5/08*    (2006.01)
(52) U.S. Cl.
   CPC ... *B60W 30/188* (2013.01); *B60W 2050/0077* (2013.01); *B60W 2050/0079* (2013.01); *B60W 2510/081* (2013.01); *B60W 2510/085* (2013.01); *B60W 2510/087* (2013.01); *G07C 5/0808* (2013.01); *Y02T 10/644* (2013.01); *Y02T 10/7275* (2013.01)
(58) Field of Classification Search
   CPC ... B60W 2050/0079; B60W 2510/085; B60W 2510/087; B60W 2050/0077; B60W 2510/081; Y02T 10/644; Y02T 10/7275
   See application file for complete search history.

(56) References Cited

U.S. PATENT DOCUMENTS

| | | | |
|---|---|---|---|
| 2009/0306841 A1 | 12/2009 | Miwa et al. | |
| 2010/0057292 A1* | 3/2010 | Ishikawa et al. | G07C 5/008 701/31.4 |
| 2013/0173084 A1* | 7/2013 | Tagawa et al. | G07C 5/008 701/1 |
| 2013/0218400 A1* | 8/2013 | Knoop et al. | G07C 5/008 701/31.4 |
| 2013/0226391 A1* | 8/2013 | Norbruch et al. | G07C 5/008 701/31.4 |
| 2014/0012449 A1* | 1/2014 | Arita | B60W 20/00 701/22 |
| 2017/0352200 A1* | 12/2017 | Wang et al. | G08G 1/163 |

FOREIGN PATENT DOCUMENTS

| | | |
|---|---|---|
| JP | 2013-140057 A | 7/2013 |
| JP | 2014-113977 A | 6/2014 |

OTHER PUBLICATIONS

Japanese Office Action, dated Nov. 20, 2018, in Japanese Application No. 2017-059058 and English Translation thereof.

\* cited by examiner

VEHICLE CONTROL DEVICE, SERVER, VEHICLE MOTOR CONTROL SYSTEM, AND VEHICLE MOTOR CONTROL METHOD

CROSS-REFERENCE TO RELATED APPLICATIONS

The present application claims priority from Japanese Patent Application No. 2017-059058 filed on Mar. 24, 2017, the entire contents of which are hereby incorporated by reference.

BACKGROUND

1. Technical Field

The present invention relates to a vehicle control device, a server, a vehicle motor control system, and a vehicle motor control method.

2. Related Art

Conventionally, for instance, Japanese Unexamined Patent Application Publication No. 2013-140057 (Patent Literature 1) describes the execution of acceleration and deceleration information transmission processing for detecting changes in the acceleration and deceleration of a vehicle and transmitting the acceleration and deceleration information to a server device and the execution of loss and regeneration parameter calculation processing performed by the arithmetic processing unit of the server for calculating loss and regeneration parameters used for estimating a continuously drivable area and continuously drivable area estimation processing for estimating the continuously drivable area.

Although current control is made to maximize the motor efficiency in a vehicle driven by a motor, the parameters for this purpose are determined by prior adaptation. On the other hand, variations in motor characteristics maybe generated due to individual differences of the motor. In addition, the motor characteristics may change due to a malfunction. When the motor characteristics change from the prior adaptation, it is difficult to maximize the efficiency of the motor under such conditions.

SUMMARY OF THE INVENTION

It is desirable to provide a novel and improved vehicle control device, server, vehicle motor control system, and vehicle motor control method that can maximize the efficiency of a motor according to the state of the motor.

An aspect of the present invention provides a vehicle control device including a motor information acquisition unit, a transmitting unit, a receiving unit and a motor controller. The motor information acquisition unit is configured to acquire motor information about a motor for driving a vehicle with the motor being in a predetermined state. The transmitting unit is configured to transmit the acquired motor information to an external server. The receiving unit is configured to receive an adaptive value of a motor control parameter. The adaptive value is adapted by the server on a basis of n the motor information. The motor controller is configured to control the motor on a basis of the received adaptive value.

Another aspect of the present invention provides server including a receiving unit, a motor state estimating unit, an adapting unit and a transmitting unit. The receiving unit is configured to receive, from a vehicle, motor information about a motor for driving the vehicle with the motor being in a predetermined state. The motor state estimating unit is configured to create a model indicating a state of the motor on a basis of the received motor information and estimates the state of the motor. The adapting unit is configured to adapt a motor control parameter using the model. The transmitting unit is configured to transmit an adaptive value of the motor control parameter adapted by the adapting unit to the vehicle.

Another aspect of the present invention provides a vehicle motor control system including a vehicle control device and a server. The vehicle control device includes a motor information acquisition unit, a transmitting unit, a receiving unit and a motor controller. The motor information acquisition unit is configured to acquire motor information about a motor for driving a vehicle with the motor being in a predetermined state. The transmitting unit is configured to transmit the acquired motor information to the server. The receiving unit is configured to receive an adaptive value of a motor control parameter. The adaptive value is adapted by the server on a basis of the motor information. The motor controller is configured to control the motor on a basis of the received adaptive value. The server includes a receiving unit, a motor state estimating unit, an adapting unit and a transmitting unit. The receiving unit is configured to receive the motor information. The motor state estimating unit is configured to create a model indicating a state of the motor on a basis of the received motor information and estimate the state of the motor. The adapting unit is configured to adapts the motor control parameter using the model. The transmitting unit is configured to transmit the motor control parameter adapted by the adapting unit to the vehicle control device.

Another aspect of the present invention provides a vehicle motor control method including acquiring motor information about a motor for driving a vehicle using a control device provided in the vehicle with the motor being in a predetermined state, transmitting the acquired motor information to an external server using the control device, receiving the motor information using the server, creating a model indicating a state of the motor on a basis of the received motor information and estimating the state of the motor using the server, adapting a motor control parameter on a basis of the model using the server, transmitting an adaptive value of the motor control parameter obtained by the adapting to the control device using the server, receiving the adaptive value of the motor control parameter using the control device, and controlling the motor on a basis of the received adaptive value using the control device.

DETAILED DESCRIPTION

Figure 1:
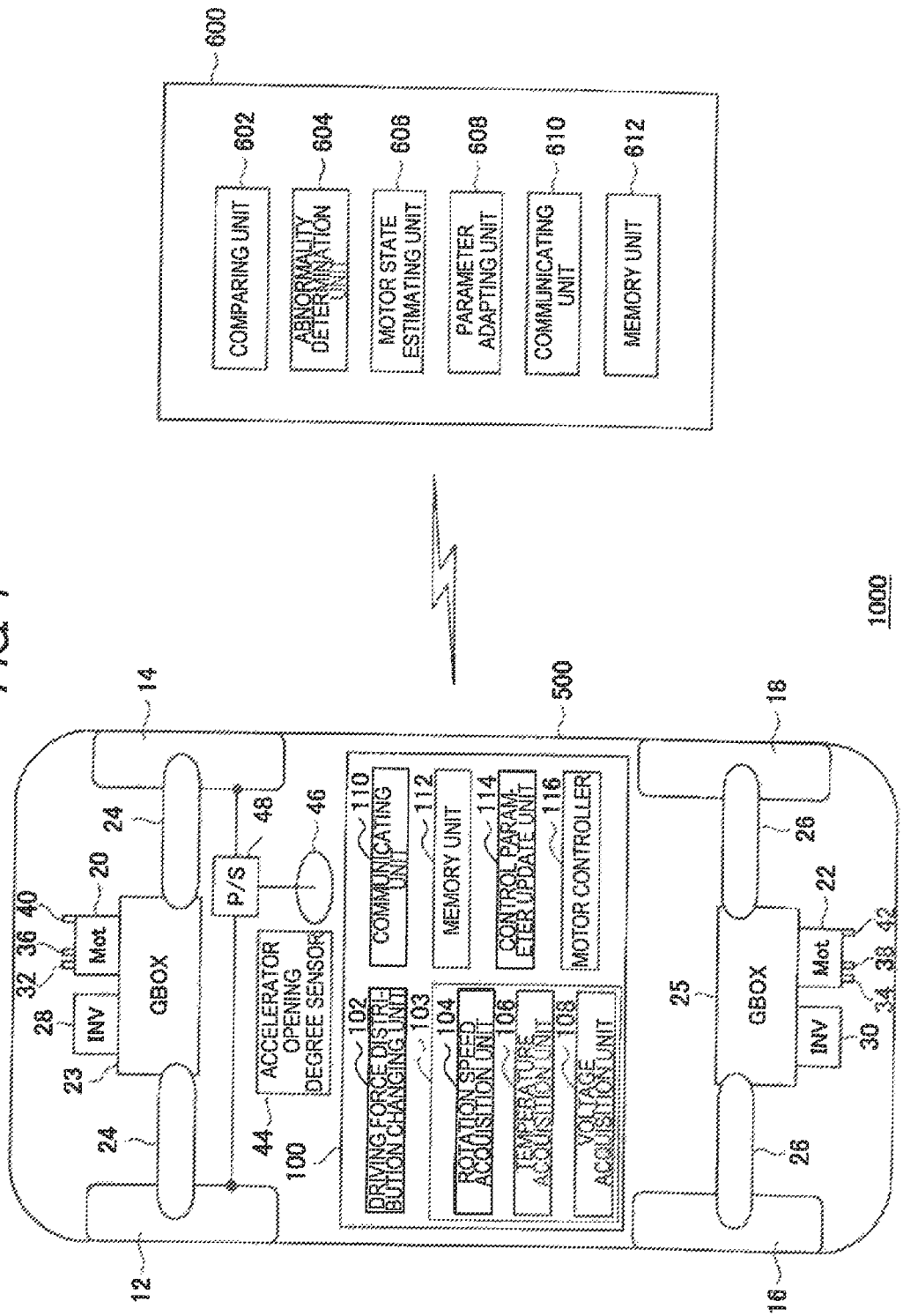
FIG. 1 is a schematic view illustrating the configuration of a system according to an example of the present invention.

A preferred example of the present invention will now be described in detail below with reference to the accompanying drawings. In the present specification and the drawings, the same reference numerals are given to components having substantially the same functional configuration, and repeated explanations are omitted.

The configuration of a vehicle motor control system 1000 according to the example of the present invention will be described with reference to FIG. 1. FIG. 1 is a schematic view illustrating the configuration of the vehicle motor control system 1000 according to the example of the present invention. As illustrated in FIG. 1, the vehicle motor control system 1000 includes a vehicle 500 and a server 600. The vehicle 500 and the server 600 can communicate with each other via, for instance, a communication standard such as LTE (Long Term Evolution). The server 600 may be, for instance, a cloud server provided on the cloud.

As illustrated in FIG. 1, the vehicle 500 includes four tires (wheels) 12, 14, 16, and 18 of front wheels and rear wheels, a control device (controller) 100, a motor 20 that controls the rotation of the tires 12 and 14 of the front wheels, a motor 22 that controls the rotation of the tires 16 and 18 of the rear wheels, a gear box 23 and a drive shaft 24 that transfer the driving force of the motor 20 to the tires 12 and 14, a gear box 25 and a drive shaft 26 that transfer the driving force of the motor 22 to the tires 16 and 18, an inverter 28 that controls the motor 20 of the front wheels, an inverter 30 that controls the motor 22 of the rear wheels, a rotation speed sensor 32 that detects the number of revolutions of the motor 20 of the front wheels, a rotation speed sensor 34 that detects the number of revolutions of the motor 22 of the rear wheels, a temperature sensor 36 that detects the temperature of the motor 20 of the front wheels, a temperature sensor 38 that detects the temperature of the motor 22 of the rear wheels, a voltage sensor 40 that detects the voltage of the motor 20 of the front wheels, a voltage sensor 42 that detects the voltage of the motor 22 of the rear wheels, an accelerator opening degree sensor 44, a steering wheel 46 that steers the front wheels 12 and 14, and a power steering mechanism 48.

The driving of the motors 20 and 22 is controlled by controlling the inverters 28 and 30 corresponding to the motors 20 and 22 based on an instruction from the control device 100.

Although the configuration illustrated in FIG. 1 has one motor 20 for driving the front wheels and one motor 22 for driving the rear wheels, the invention is not limited to this configuration and four motors may be provided so as to drive the four wheels.

Although an electric vehicle such as the vehicle 500 according to the example performs current control so as to maximize the efficiency of the motors 20 and 22, the parameters for this purpose are determined in advance by the prior adaptation before shipment. On the other hand, when the motor characteristics change from the prior adaptation because variations are generated in the motor characteristics due to individual differences of the motor or the motor characteristics change due to a malfunction as described above, it is difficult to maximize the efficiency of the motor under such conditions.

Accordingly, in the vehicle motor control system 1000 according to the example, the control parameters of the motors 20 and 22 can be changed based on external information. Specifically, information of the vehicle 500 is transmitted to the server 600 external to the vehicle, the server 600 determines whether the characteristics of the motors 20 and 22 have been changed based on the information, and the control parameters for maximizing the efficiency in consideration of changes in the motor characteristics are returned from the server 600 to the vehicle 500. When receiving the control parameters, the vehicle 500 controls the motors 20 and 22 using the parameters. Even when the motor characteristics change from the prior adaptation because, for instance, variations are generated in the motor characteristics due to individual differences of the motors 20 and 22 or the motor characteristics change due to a malfunction, the efficiency of the motors 20 and 22 can be maximized under such conditions.

In order to achieve the above control, the control device 100 includes a driving force distribution changing unit 102, a motor information acquisition unit 103, a communicating unit 110, a memory unit 112, a control parameter update unit 114, and a motor controller 116 as illustrated in FIG. 1. The motor information acquisition unit 103 includes a rotation speed acquisition unit 104, a temperature acquisition unit 106, and a voltage acquisition unit 108.

In addition, the server 600 includes a comparing unit 602, an abnormality determination unit 604, a motor state estimating unit 606, a parameter adapting unit 608, a communicating unit 610, and a memory unit 612. It should be noted that the components of the control device 100 and the components of the server 600 illustrated in FIG. 1 may be hardware such as circuits, central arithmetic processing devices such as CPUs, and programs (software) for functioning them.

Figure 2:
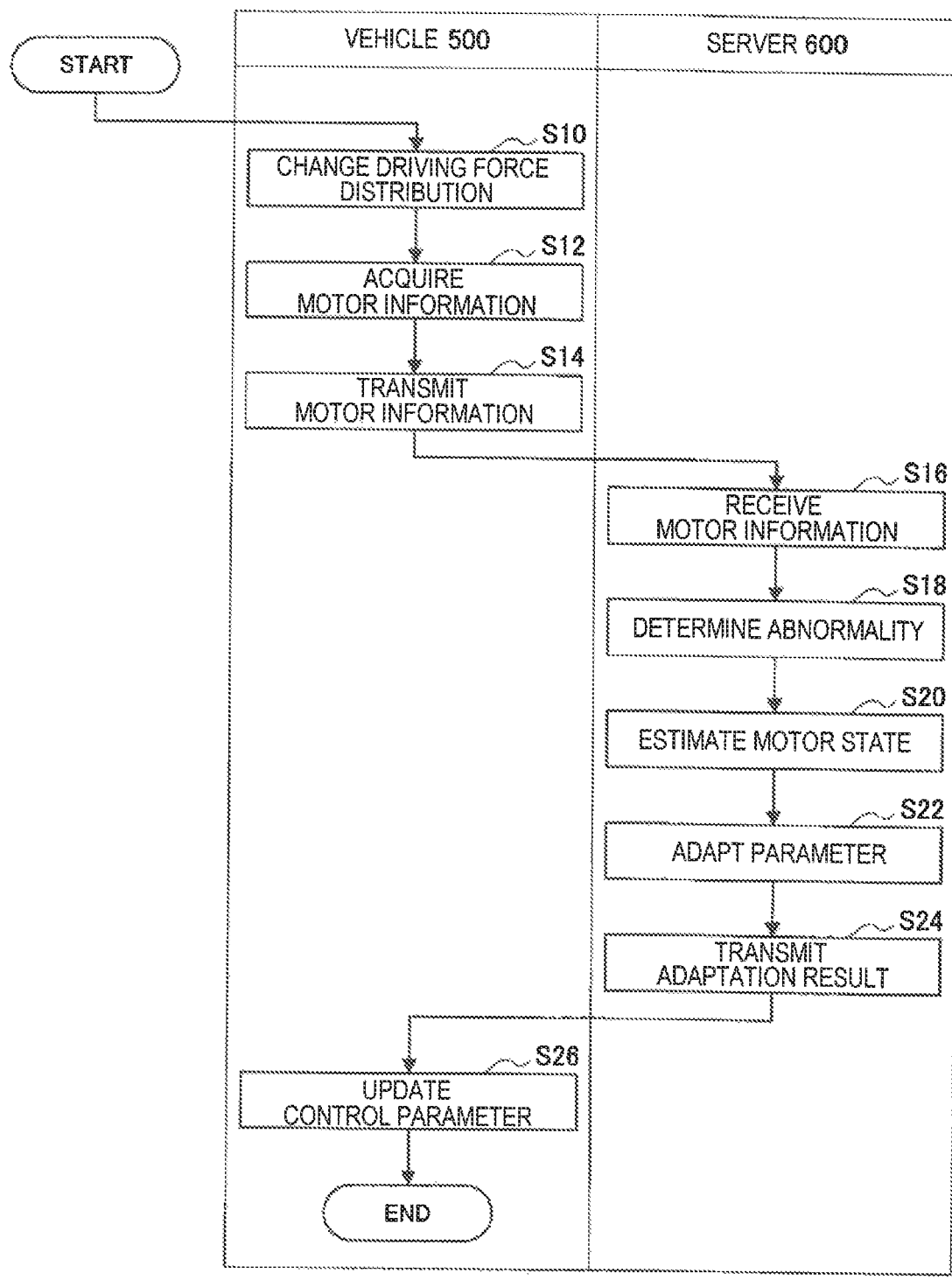
FIG. 2 is a sequence diagram representing the processing performed between a vehicle and a server according to the example.

FIG. 2 is a sequence diagram representing the processing performed between the vehicle 500 and the server 600 according to the example. First, in step S10, the driving force distribution of the vehicle 500 is changed. Of the drive shafts (drive shafts 24) of the tires 12 and 14 of the front wheels and the drive shafts (drive shafts 26) of the tires 16 and 18 of the rear wheels, the driving force distribution among the front and rear drive shafts is changed so that the driving force of one drive shafts to be adapted is zero and the other drive shafts output a driver request driving force. Specifically, the driving force distribution changing unit 102 of the control device 100 provides an instruction (zero-torque instruction) that sets the driving force of the motor of one drive shafts to zero. With this, the state of the motor can be estimated accurately for the drive shafts for which the driving force is set to zero. The following will describe the case in which the driving force of the motor 20 for driving the tires 12 and 14 of the front wheels is set to zero.

In step S12, information (the number of revolutions, the temperature, and the voltage) of the motor 20 is acquired during a travel of the vehicle 500 in the state in which the driving force of the motor 20 of the front wheels is zero. The number of revolutions of the motor 20 is detected by the rotation speed sensor 32 and acquired by the rotation speed acquisition unit 104 of the control device 100. The temperature of the coil or magnet of the motor 20 is detected by the temperature sensor 38 as the temperature of the motor 20 and acquired by the temperature acquisition unit 106 of the control device 100. In addition, the voltage of the motor 20 is detected by the voltage sensor 40 and acquired by the voltage acquisition unit 108 of the control device 100. With this, during a travel of the vehicle 500, the voltage corresponding to any number of revolutions of the motor and any temperature is acquired.

During a travel of the vehicle 500, the tires 12 and 14 of the front wheels rotate and this rotation is transferred to the motor 20 via the gear box 23 and the drive shafts 24. Accordingly, the motor 20 of the front wheels rotates in the state in which the zero-torque instruction is provided. The voltage sensor 40 detects the inter-terminal voltage (induced voltage) of the motor 20 in the state in which the zero-torque instruction is provided and the driving force of the motor 20 is 0. In the state in which the zero-torque instruction is provided, the terminals of the motor 20 are opened and no current flows between the terminals. Accordingly, the inter-terminal voltage is basically a predefined value (for instance, zero) when the motor 20 does not malfunction and no variations are generated in the motor characteristics. However, when the motor 20 malfunctions or variations are generated in the motor characteristics, the inter-terminal voltage deviates from the predefined value. Accordingly, the state of the motor 20 can be determined based on the inter-terminal voltage.

Although the vehicle 500 and the server 600 communicate with each other during a travel of the vehicle 500 in the example, the present invention is not limited to this configuration. For instance, information of the motor 20 maybe acquired during a travel of the vehicle 500 and stored in the memory unit 112, the information may be transmitted to the server 600 when the vehicle 500 stops, and the adaptive values of the control parameters may be transmitted from the server 600 to the vehicle 500. In this case, the vehicle 500 and the server 600 may be coupled to each other via a wire.

In step S14, the communicating unit 110 of the control device 100 and the communicating unit 610 of the server 600 perform processing for communication between the control device 100 and the server 600 and the information (the number of revolutions, the temperature, and the voltage) of the motor 20 acquired in step S12 by the control device 100 is transmitted to the server 600. In step S16, the server 600 receives the information of the motor 20 transmitted by the vehicle 500 in step S14.

In step S18, the server 600 determines the presence or absence of an abnormality caused by changes in the motor characteristics due to a malfunction of the motor 20 or variations in the motor characteristics due to individual differences. Specifically, the comparing unit 602 of the server 600 first compares the voltage corresponding to the certain number of revolutions of the motor and the certain temperature received by the communicating unit 610 with a preset voltage reference value. The voltage reference value is preset according to the number of revolutions and the temperature during adaptation before shipment and the memory unit 612 of the server 600 stores the voltage reference value corresponding to the number of revolutions and the temperature in advance. According to the number of revolutions of the motor and the temperature received by the server 600, the voltage reference value stored in the memory unit 612 is read and the comparing unit 602 compares the voltage reference value with the voltage of the motor 20 received by the server 600. In the comparison, the difference between the voltage of motor 20 received by the server 600 and the voltage reference value is compared with a predetermined threshold value, and when the difference is larger than the threshold value, it is determined that the difference between the voltage of the motor 20 received by the server 600 and the voltage reference value is larger. Then, when the difference between the voltage of the motor 20 received by the server 600 and the voltage reference value is larger, the abnormality determination unit 604 determines that there is an abnormality caused by changes in the motor characteristics due to a malfunction of the motor 20 or variations in the motor characteristics caused by individual differences.

When it is determined that the motor 20 has an abnormality in step S18, the processing proceeds to step S20. In step S20, the state of the motor 20 is estimated. In this step, the motor state estimating unit 606 estimates the state of the motor 20 based on the difference between the voltage received by the server 600 and the voltage reference value and creates a plant model 650 indicating the current state of the motor 20.

The voltage (detection voltage value) corresponding to the certain number of revolutions of the motor and the certain temperature detected by the vehicle 500 matches the voltage reference value corresponding to the number of revolutions and the temperature when the motor 20 is normal. In contrast, when the detection voltage value differs from the voltage reference value, it is estimated that an abnormality is present in the motor 20 such as, for instance, reduction in the magnetic force of the motor 20. An abnormality in the motor 20 can be estimated based on the difference between the detection voltage value and the voltage reference value. For instance, when the difference between the detection voltage value and the voltage reference value indicates a certain value at the certain number of revolutions and the certain temperature, it is possible to predict the part of the motor 20 having a reduced magnetic force with respect to the magnetic force during adaptation before shipment. Accordingly, it is possible to create the plant model 650 indicating the state of the motor 20 by estimating the state of the motor 20 based on the difference between the detection voltage value and the voltage reference value.

When it is determined that the motor 20 is normal in step S18, the processing in step S20 and the subsequent steps is not performed. In this case, when it is determined that the motor 20 is normal, the communicating unit 610 transmits a notification that the motor 20 is normal to the vehicle 500. When the vehicle 500 receives this notification, the driving force distribution changing unit 102 releases the zero-torque instruction for the motor 20. Accordingly, when it is determined that the motor 20 is normal, the vehicle 500 is operated without changing the control parameters of the motor 20.

Figure 3:
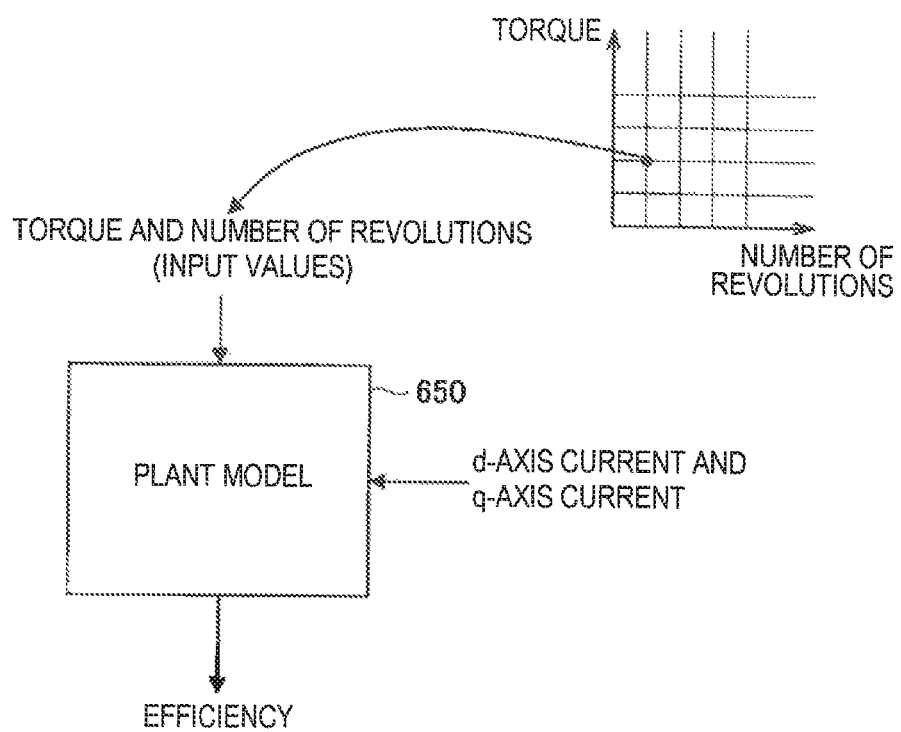
FIG. 3 is a schematic view illustrating the adapting processing of parameters in step S22 in FIG. 2.

In step S22, the parameter adapting unit 608 adapts the parameters using the plant model 650. The parameter adapting unit 608 adapts the control parameters used by the inverter 28 to control the motor 20 using the plant model 650. FIG. 3 is a schematic view illustrating the adapting processing of the control parameters in step S22. In the adaptation of the control parameters, the control parameters to be adapted are the motor current value and the phase angle (d-axis current and q-axis current). The input values of any number of revolutions of the motor and any motor torque are input to the plant model 650, loop calculation is performed while the motor current value and the phase angle (d-axis current and q-axis current) are changed, and the motor current value and the phase angle that provide the maximum motor efficiency are determined to be the adaptive values. By performing such adaptation on a plurality of combinations of the number of revolutions of the motor and the motor torque, the adaptive values of the motor current value and the phase angle can be calculated for each combinations of the number of revolutions of the motor and the motor torque.

In step S24, the adaptive values calculated in step S22 are transmitted from the server 600 to the vehicle 500. In step S26, the control parameter update unit 114 updates the control parameters of the inverter 28 based on the adaptive values transmitted from the server 600. After that, the motor controller 116 controls the motor 20 using the updated control parameters.

Since the processing for estimating the motor characteristics and adapting the control parameters based on the estimated motor characteristics has very heavy processing loads, the processing cannot be performed virtually by an in-vehicle computer. However, sufficient processing capability can be obtained if the external server 600 is used, so adapting processing having heavy processing loads can be performed. Since this enables adaptation suitable for the individual characteristics of the motors, the driving and the regeneration control of the motors can be performed at optimum efficiency.

Figure 4:
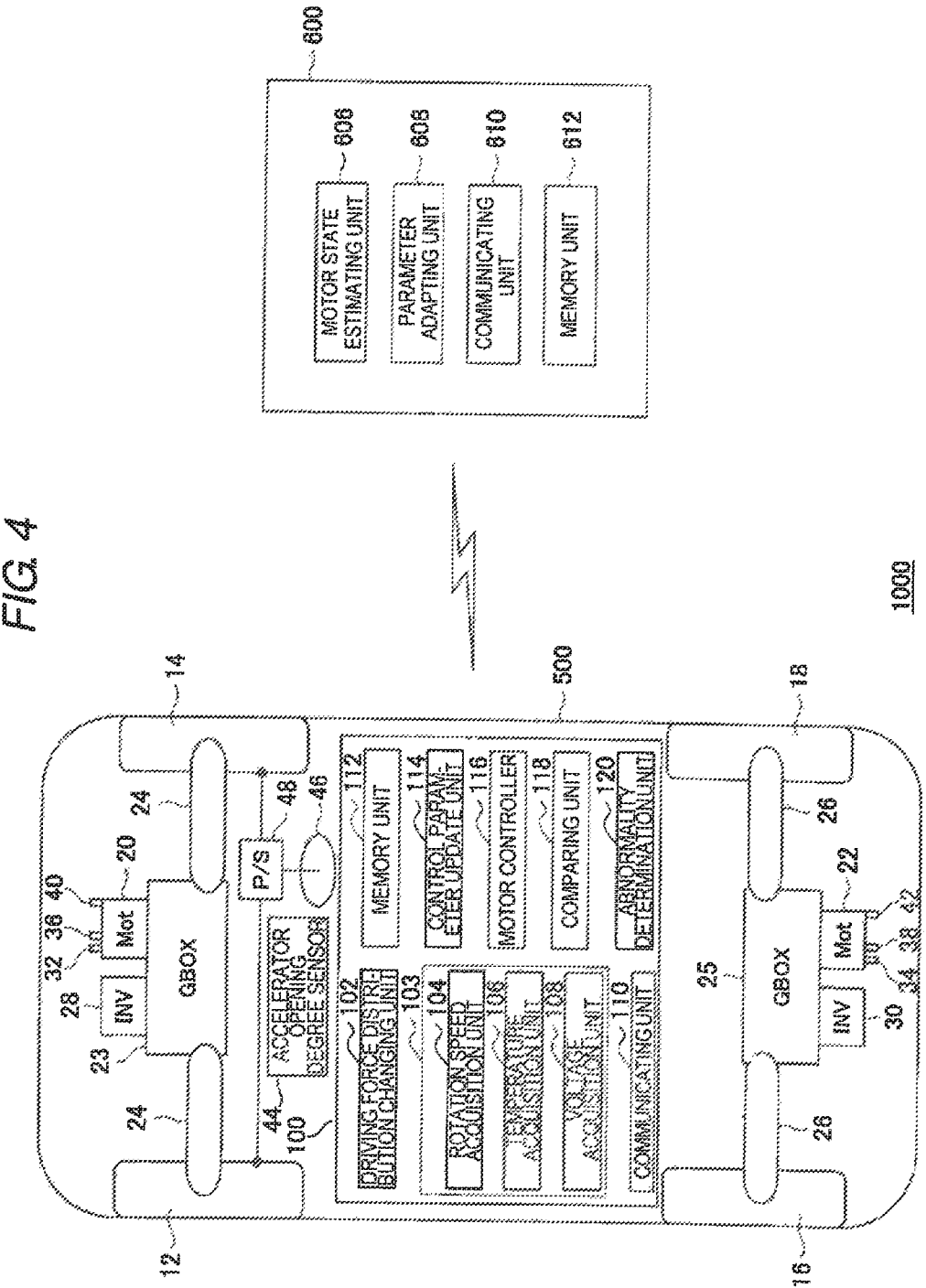
FIG. 4 is a schematic view illustrating another configuration example of the system according to the example.

FIG. 4 is a schematic view illustrating another configuration example of the vehicle motor control system 1000 according to the example. In the example illustrated in FIG. 4, the control device 100 has a comparing unit 118 and an abnormality determination unit 120 and the server 600 does not have the comparing unit 602 and the abnormality determination unit 604. The functions of the comparing unit 118 and the abnormality determination unit 120 provided for the control device 100 are the same as the functions of the comparing unit 602 and the abnormality determination unit 604 provided for the server 600 illustrated in FIG. 1.

In the configuration illustrated in FIG. 4, the processing by the comparing unit 602 and the abnormality determination unit 604 that is performed by the server 600 in FIG. 1 is performed by the control device 100 of the vehicle 500. The memory unit 112 stores the voltage reference value that depends on the number of revolutions and the temperature in advance and the voltage reference value stored in the memory unit 112 is read when the comparing unit 118 makes comparison.

Figure 5:
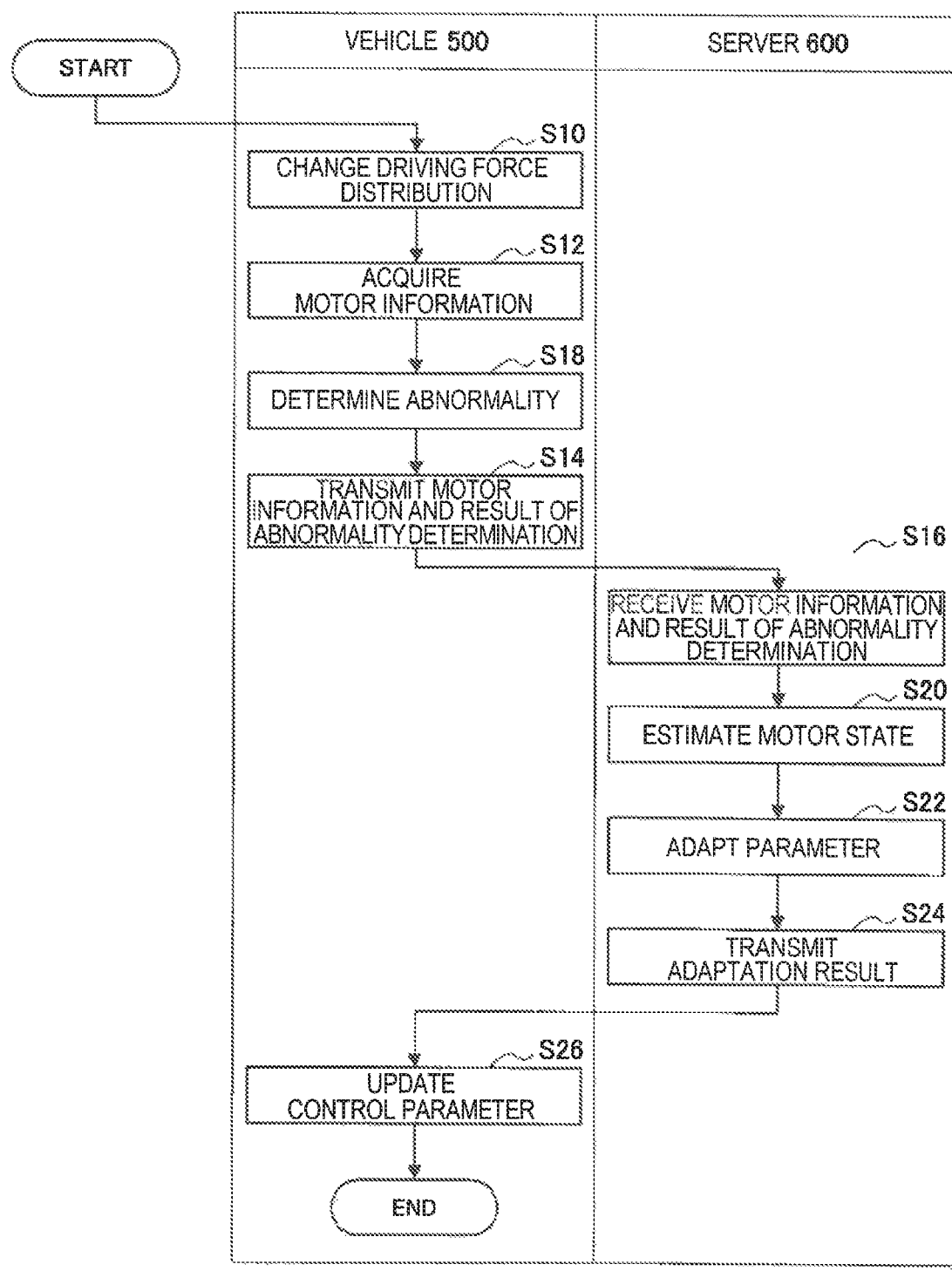
FIG. 5 is a sequence diagram illustrating the processing performed between the vehicle and the server in the configuration illustrated in FIG. 4.

FIG. 5 is a sequence diagram illustrating the processing performed between the vehicle 500 and the server 600 in the configuration illustrated in FIG. 4. In FIG. 5, the processes in steps S10, S12, S20, S22, S24, and S26 are the same as in FIG. 2. In FIG. 5, the abnormality determination process in step S18 is performed by the control device 100, and in the transmission step in step S14, the result of abnormality determination as well as motor information is transmitted to the server 600. The server 600 receives the result of abnormality determination as well as the motor information in step S16.

When it is determined that the motor 20 is normal as a result of the abnormality determination in step S18, the transmission process in step S14 is not performed. In this case, the driving force distribution changing unit 102 releases the zero-torque instruction for the motor 20. Accordingly, when it is determined that the motor 20 is normal, the vehicle 500 is operated without changing the control parameters of the motor 20.

Although the driving force of one drive shafts to be adapted among the drive shafts of the tires 12 and 14 of the front wheels and the drive shafts of the tires 16 and 18 of the rear wheels is assumed to be zero in the above example, when, for instance, the four wheels are provided with independent motors, the driving force of any one of the motors maybe set to zero and the other three motors may output driver request driving forces. In this case, the control parameters can be adapted by transmitting the information of the motor for which the driving force is set to zero to the server 600. In addition, although the information (the number of revolutions, the temperature, and the voltage) of the motor 20 is obtained during a travel of the vehicle 500 in the state in which the driving force of the motor is set to zero (zero-torque instruction state), the driving force of the motor is not limited to zero as long as the predetermined state is entered and the torque may be a positive value (driving instruction state) or a negative value (regeneration instruction state).

As described above, in the example, the number of revolutions, the temperature, and the voltage of the motor 20 are transmitted to the server 600 in the state in which the driving force of the motor 20 of the vehicle 500 is zero, the plant model 650 is created based on the result of comparison between the voltage received by the server 600 and the voltage reference value, and the control parameters of the motor 20 are adapted using the plant model 650. This enables the control parameters that require heavy processing loads to be certainly adapted by the server 600 and the motor 20 of the vehicle 500 to be driven using the adapted control parameters by transmitting the adaptive values of the control parameters to the vehicle 500. With this, even when the motor characteristics change from the adaptation during shipment because, for instance, variations are generated in the motor characteristics due to individual differences of the motor 20 or the motor characteristics change due to a malfunction, the efficiency of the motor 20 can be maximized under such conditions.

Although a preferred example of the present invention has been described above in detail with reference to the accompanying drawings, the present invention is not limited to the example. Provided a person has ordinary knowledge in the technical field to which the example of the present invention pertains, within the scope of the technical idea described in the claims, the example of the present invention is intended to cover various changes or modifications, and such modifications are intended to fall within the technical scope of the present invention.

The invention claimed is:

1. A vehicle control device, comprising:
   a motor information acquisition unit configured to acquire motor information about a motor for driving a vehicle With the motor being in a predetermined state;
   a transmitting unit configured to transmit the acquired motor information to an external server;
   a receiving unit configured to receive an adaptive value of a motor control parameter, the adaptive value being adapted by the external server on a basis of the motor information;
   a motor controller configured to control the motor on a basis of the received adaptive value;
   a motor state estimating unit configured to create a model indicating a state of the motor on a basis of the received motor information and to estimate the state of the motor;
   an adapting unit configured to adapt a motor control parameter using the model,
      wherein the motor information comprises a number of revolutions of the motor, a temperature of the motor, and a voltage of the motor;
   an abnormality determination unit configured to make a determination on presence or absence of an abnormality of the motor based on the motor information,
      wherein the motor state estimating unit creates the model when the presence of the abnormality of the motor is determined and estimates the state of the motor; and
   a comparing unit configured to make comparison between a voltage reference value that depends on the number of revolutions of the motor, the temperature of the motor, and the voltage of the motor,
      wherein the abnormality determination unit makes the determination on presence or absence of the abnormality on a basis of a result of the comparison by the comparing unit.

2. The vehicle control device according to claim 1, wherein the motor information acquisition unit acquires the motor information when the motor does not generate a driving force while the vehicle travels.

3. The vehicle control device according to claim 1, wherein the transmitting unit transmits a result of the determination together with the motor information to the external server.

4. The vehicle control device according to claim 3, wherein the transmitting unit does not transmit the motor information or the result of the determination to the external server when no abnormality is present in the motor.

5. A server, comprising:
a receiving unit configured to receive, from a vehicle, motor information about a motor for driving the vehicle with the motor being in a predetermined state;
a motor state estimating unit configured to create a model indicating a state of the motor on a basis of the received motor information and to estimate the state of the motor;
an adapting unit configured to adapt a motor control parameter using the model;
a transmitting unit configured to transmit an adaptive value of the motor control parameter adapted by the adapting unit to the vehicle,
wherein the motor information comprises a number of revolutions of the motor, a temperature of the motor, and a voltage of the motor;
an abnormality determination unit configured to make a determination on presence or absence of an abnormality of the motor based on the motor information,
wherein the motor state estimating unit creates the model when the presence of the abnormality of the motor is determined and estimates the state of the motor; and
a comparing unit configured to make comparison between a voltage reference value that depends on the number of revolutions of the motor, the temperature of the motor, and the voltage of the motor,
wherein the abnormality determination unit makes the determination on presence or absence of the abnormality on a basis of a result of the comparison by the comparing unit.

6. The server according to claim 5, wherein the receiving unit receives the motor information acquired when the motor does not generate a driving force while the vehicle travels.

7. The server according to claim 5, wherein the motor state estimating unit creates the model on the basis of the result of the comparison by the comparing unit.

8. The server according to claim 5, wherein the adapting unit receives a motor current value and a phase angle as the motor control parameters and adapts the motor current value and the phase angle such that motor efficiency is maximized with respect to input values of a motor torque and a number of revolutions of a motor input to the model.

9. A vehicle motor control system, comprising:
a vehicle control device and a server,
wherein the vehicle control device comprises:
a motor information acquisition unit configured to acquire motor information about a motor for driving a vehicle with the motor being in a predetermined state;
a transmitting unit configured to transmit the acquired motor information to the server;
a receiving unit configured to receives an adaptive value of a motor control parameter, the adaptive value being adapted by the server on a basis of the motor information; and
a motor controller configured to control the motor on a basis of the received adaptive value, and
wherein the server comprises:
a receiving unit configured to receive the motor information;
a motor state estimating unit configured to create a model indicating a state of the motor on a basis of the received motor information and estimate the state of the motor;
an adapting unit configured to adapt the motor control parameter using the model;
a transmitting unit configured to transmit the motor control parameter adapted by the adapting unit to the vehicle control device,
wherein the motor information comprises a number of revolutions of the motor, a temperature of the motor, and a voltage of the motor;
an abnormality determination unit configured to make a determination on presence or absence of an abnormality of the motor on a basis of the motor information received from the vehicle control device,
wherein the motor state estimating unit creates the model when the presence of the abnormality of the motor is determined and estimates the state of the motor; and
a comparing unit configured to make comparison between a voltage reference value that depends on the number of revolutions of the motor, the temperature of the motor, and the voltage of the motor,
wherein the abnormality determination unit of the server makes the determination on presence or absence of the abnormality on a basis of a result of the comparison by the comparing unit.

10. The vehicle motor control system according to claim 9, wherein the motor information acquisition unit acquires the motor information when the motor does not generate a driving force while the vehicle travels.

11. The vehicle motor control system according to claim 9, wherein the vehicle control device further comprises an abnormality determination unit configured to make a determination on presence or absence of an abnormality of the motor based on the motor information, and
wherein the transmitting unit of the vehicle control device transmits a result of the determination together with the motor information to the server.

12. The vehicle motor control system according to claim 11, wherein the transmitting unit of the vehicle control device does not transmit the motor information or the result of the determination to the server when no abnormality is present in the motor.

13. The vehicle motor control system according to claim 9, wherein the motor state estimating unit creates the model on the basis of the result of the comparison by the comparing unit.

14. The vehicle motor control system according to claim 9, wherein the adapting unit receives a motor current value and a phase angle as the motor control parameters and adapts the motor current value and the phase angle such that motor efficiency is maximized with respect to input values of a motor torque and a number of revolutions of a motor input to the model.

15. A vehicle motor control method, comprising:

acquiring motor information about a motor for driving a vehicle using a control device provided in the vehicle with the motor being in a predetermined state;

transmitting the acquired motor information to an external server using the control device;

receiving the motor information using the external server;

creating a model indicating a state of the motor on a basis of the received motor information and estimating the state of the motor using the external server;

adapting a motor control parameter on a basis of the model using the external server;

transmitting an adaptive value of the motor control parameter obtained by the adapting to the control device using the external server;

receiving the adaptive value of the motor control parameter using the control device;

controlling the motor on a basis of the received adaptive value using the control device, wherein the motor information comprises a number of revolutions of the motor, a temperature of the motor, and a voltage of the motor;

determining a presence or absence of an abnormality of the motor based on the motor information, wherein the model is created when the presence of the abnormality of the motor is determined and the state of the motor is estimated; and comparing between a voltage reference value that depends on the number of revolutions of the motor, the temperature of the motor, and the voltage of the motor, wherein the determination on presence or absence of the abnormality is made on a basis of a result of the comparison.

16. The vehicle motor control method according to claim 15, wherein the control device acquires the motor information when the motor does not generate a driving force while the vehicle travels.

* * * * *